(12) United States Patent
Watanabe et al.

(10) Patent No.: US 8,390,157 B2
(45) Date of Patent: Mar. 5, 2013

(54) COOLING MECHANISM FOR AXIAL GAP TYPE ROTATING MACHINES

(75) Inventors: Naoki Watanabe, Tokyo (JP); Koji Miyata, Tokyo (JP); Minori Miyata, legal representative, Fukui (JP); Atsushi Miyata, legal representative, Fukui (JP)

(73) Assignee: Shin-Etsu Chemical Co., Ltd. (JP)

( * ) Notice: Subject to any disclaimer, the term of this patent is extended or adjusted under 35 U.S.C. 154(b) by 250 days.

(21) Appl. No.: 12/775,127

(22) Filed: May 6, 2010

(65) Prior Publication Data

US 2010/0289350 A1    Nov. 18, 2010

(30) Foreign Application Priority Data

May 14, 2009 (JP) ................................. 2009-117595

(51) Int. Cl.
*H02K 5/18* (2006.01)
*H02K 9/04* (2006.01)

(52) U.S. Cl. .......................................... 310/64; 310/268

(58) Field of Classification Search .................. 310/43, 310/58, 62–63, 64, 266, 268
See application file for complete search history.

(56) References Cited

U.S. PATENT DOCUMENTS

| | | | | |
|---|---|---|---|---|
| 3,749,953 | A * | 7/1973 | Baumann et al. | 310/62 |
| 5,789,833 | A * | 8/1998 | Kinoshita et al. | 310/64 |
| 6,768,232 | B1 * | 7/2004 | Kalsi | 310/52 |
| 7,750,515 | B1 * | 7/2010 | Gabrys | 310/61 |
| 2008/0231131 | A1* | 9/2008 | Gabrys et al. | 310/114 |
| 2009/0179506 | A1* | 7/2009 | Saga et al. | 310/45 |

FOREIGN PATENT DOCUMENTS

| | | | |
|---|---|---|---|
| JP | 55066246 A | * | 5/1980 |
| JP | 56129550 A | * | 10/1981 |
| JP | 2005-110372 | | 4/2005 |
| WO | WO 2009055626 A1 | * | 4/2009 |

* cited by examiner

*Primary Examiner* — Tran Nguyen
(74) *Attorney, Agent, or Firm* — Myers Bigel Sibley & Sajovec, PA

(57) ABSTRACT

A stator has a mechanism for effectively dissipating internally generated heat, and is for use in a high power axial gap type rotating machine. The stator comprises a coil holding member and a coil secured to the coil holding member, in which the coil holding member comprises a material having a thermal conductivity of not less than 5 W/mK that is measured compliant with the ASTM E1530 and having an electrical conductivity of not more than $1 \times 10^5$ S/m that is measured compliant with the ASTM E345. This stator preferably comprises a radiation fin, having a thermal conductivity of not less than 150 W/mK, and having a bumpy surface so as to increase the surface area thereof threefold or more, at the circumference of the coil holding member.

1 Claim, 6 Drawing Sheets

COOLING MECHANISM FOR AXIAL GAP TYPE ROTATING MACHINES

CROSS-RELATED APPLICATIONS

This application claims priority from Japanese Patent Application No. 2009-117595; filed May 14, 2009, the disclosure of which is incorporated herein by reference in its entirety.

BACKGROUND OF THE INVENTION

1. Field of the Invention

The present invention relates to synchronous type permanent magnet rotating machines for use in motors, electric generators, etc., and more specifically, relates to an axial gap type rotating machine in which rotors and a stator are arranged in a direction along a rotating shaft so that the rotors are oppositely disposed with the stator being interposed therebetween.

2. Description of Related Art

From the viewpoint of structure, permanent magnet rotating machines are classified into the radial gap type and the axial gap type. The radial gap type permanent magnet rotating machine comprises a rotor, around which more than one permanent magnet is disposed, so that magnetic poles thereof are arranged in the radial direction, and a stator that is disposed to face the permanent magnets. In general, a stator has a structure in which coil is wound around an iron core which has a plurality of teeth on the face facing a rotor. The use of an iron core allows the magnetic flux from a magnetic pole of the rotor to effectively interlink with the coil, so that a motor can generate large torque and a generator can generate large voltage. The use of the iron core, however, may cause a cogging torque and a loss torque due to hysteresis loss of the iron core, which brings about the increase of an initial torque. If a rotating machine having a large initial torque is used, for example, in a wind power generator, it cannot rotate with a gentle breeze, and therefore cannot produce electricity.

This problem can be solved by removing the iron core. However, without the iron core, the magnetic efficiency is reduced, and therefore, a large output cannot be obtained with a radial gap type rotating machine. Thus, an axial gap type rotating machine 100 as illustrated in FIG. 8 is proposed.

In FIG. 8, disk-shaped magnetic components (rotor yoke) 103 are secured to a rotating shaft 102. On a surface of each rotor yoke 103, two or more permanent magnets 104 are concentrically arranged so that the magnetization direction thereof is parallel to the rotating shaft 102 and so that adjacent permanent magnets are opposite in polarity. An assembly of the aforementioned components is referred to as a rotor 105. The rotor yokes 103 are disposed at each side of a spacer 106 so that their faces having thereon the permanent magnets are opposed to each other. Although the permanent magnets 104 may be placed on only one of the rotor yokes 103, the magnetic efficiency is increased when the permanent magnets are placed on both sides of the rotor yokes 103. A stator 107 is interposed between the rotor yokes 103. The stator 107 comprises coils 108 and a coil holding member 109. When viewed in the axial direction of the rotating shaft 102, the circle defined by the concentrically-disposed coils 108 has the same diameter as of the circle defined by the permanent magnets 104 on the rotor yokes 103. Each coil 108 is secured to a housing 110 with the coil holding member 109. The housing 110 accommodates therein the aforementioned rotors 105 and the aforementioned stator 107. A bearing 111 for rotatably supporting the rotating shaft 102 is disposed between the housing 110 and the rotating shaft 102. This allows the opposed permanent magnets 104 to rotate integrally with the rotating shaft 102 so that alternating magnetic fields are interlinked within the coil 108.

In the aforementioned structure, higher output can be ensured by increasing a pole surface area without an iron core inserted in the stator. Since a problem of magnetic saturation by an iron core is not caused even if an Nd—Fe—B system sintered magnet is used as a strong magnet, the performance thereof can be fully utilized so that a high power rotating machine can be provided.

As shown in FIG. 9, the stator coil 108 is typically held by the coil holding member 109 by impregnation with an epoxy resin 112. As a material for the holding member 109, Bakelite is commonly used (see, for example, JP 2005-110372 A). Passing a large electric current is required to achieve a higher output. The challenge here is to effectively dissipate the heat generated from a copper wire through which a large current being passed. However, the aforementioned epoxy resins and Bakelite have poor thermal conductivity. Thus, they cannot effectively dissipate the heat generated from a copper wire (for reference, the thermal conductivity of an epoxy resin is 21 W/mK, and the thermal conductivity of Bakelite is 0.38 W/mK). Due to lack of cooling mechanism for the coil holding member, heat generation cannot be suppressed, so that a copper wire is broken when the axial gap type rotating machine is continuously operated as an electric generator.

SUMMARY OF THE INVENTION

In view of the foregoing, it is an object of the present invention to provide a high power axial gap type rotating machine which has an effective cooling mechanism by dissipating the internally generated heat.

Through intensive research to solve the aforementioned problems, the present inventors developed a stator, which has an effective cooling mechanism by dissipating the internally generated heat, suitable for use in an axial gap type rotating machine, and developed a high power axial gap type rotating machine.

One aspect of the invention may be a stator for use in an axial gap type rotating machine, the stator comprising a coil holding member, and a plurality of coils secured to the coil holding member, wherein the coil holding member comprises a material which has a thermal conductivity of not less than 5 W/mK that is measured compliant with the ASTM E1530 and which has an electrical conductivity of not more than $1\times10^5$ S/m that is measured compliant with the ASTM E345.

Another aspect of the invention may be an axial gap type rotating machine having a structure comprising a rotating shaft; a rotor that is arranged along the axial direction of the rotating shaft and rotatably integrated with the rotating shaft, each rotor comprising a rotary table and permanent magnets on at least one surface of the rotary table; a stator that is disposed to be separated from the rotating shaft and to be spaced apart from the rotors so that the stator is opposed to the main surface of the rotor on which the magnets are placed, and a cooling fan that is disposed at a circumference of each rotor so as to be tilted with respect to the face of each corresponding rotary table for blowing air to the radiation fin.

Another aspect of the invention is an axial gap type rotating machine comprising a rotor rotatable around a center axis of a disk, each rotor comprising a magnetic component and at least one permanent magnet attached thereon, and a stator coil that is disposed opposite to the permanent magnets when viewed in the direction along the rotating shaft, in which a material of a coil holding member has physical properties represented by a thermal conductivity of not less than 5 W/mK and an electrical conductivity of not more than $1.0 \times 10^5$ S/m.

Another aspect of the invention is an axial gap type rotating machine further comprising a radiation fin disposed at a circumference of the coil holding member, which radiation fin has a physical property represented by a thermal conductivity of not less than 150 W/mK and has a roughened surface so as to increase the surface area thereof threefold or more.

As described above, a stator of the invention and a structure of an axial gap type rotating machine of the invention enable effective dissipation of heat generated in the stator, and the industrial availability is extremely high.

DETAILED DESCRIPTION OF THE PREFERRED EMBODIMENT(S)

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

Figure 1:
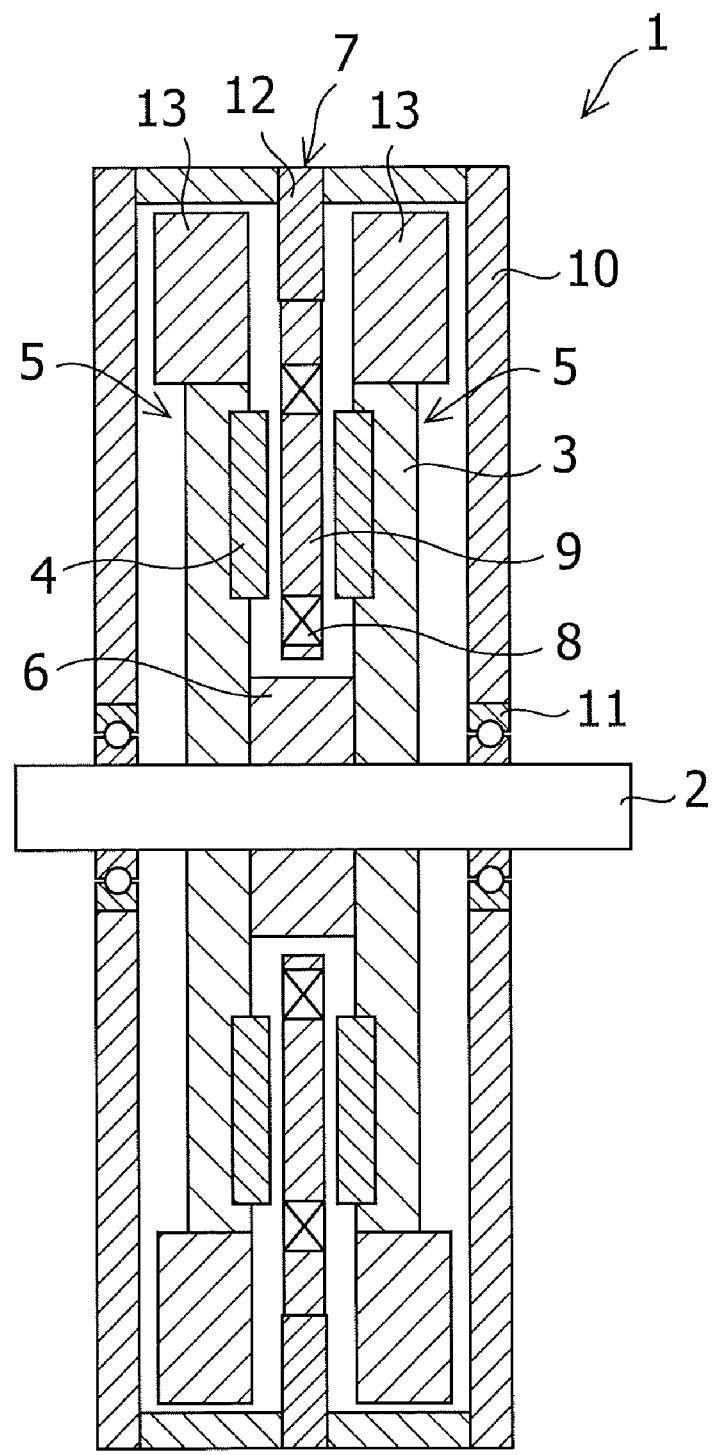
FIG. 1 is a sectional view of one embodiment of an axial gap type rotating machine according to the invention.

According to one embodiment of a rotating machine of the invention shown in FIG. 1, disk-shaped magnetic components (rotor yokes) 3 are secured to a rotating shaft 2. On a surface of the rotor yoke 3, two or more permanent magnets 4 imparted with a desired shape are concentrically arranged so that the magnetization direction thereof is parallel to a rotating shaft 2 and so that adjacent permanent magnets may have opposite polarities. An assembly of the aforementioned components is referred to as a rotor 5. The rotor yokes 3 are disposed on each side of a spacer 6 so that their faces having the permanent magnets are opposed to each other. A stator 7 is interposed between the rotor yokes 3. The stator 7 comprises coils 8 and a coil holding member 9. When viewed in the axial direction of the rotating shaft 2, the circle defined by the coils 8 that are concentrically disposed at the coil holding member 9 has the same diameter as of the circle defined by the permanent magnets 4 on the rotor yoke 3. Furthermore, the coils 8 are secured to a housing 10 via a radiation fin 12 that is disposed at a circumference of the coil holding member 9. The housing 10 accommodates therein the aforementioned rotors 5 and stator 7. A bearing 11 for rotatably supporting the rotating shaft 2 is disposed between the housing 10 and the rotating shaft 2. This allows the opposed permanent magnets 4 to rotate integrally with the rotating shaft 2 so that alternating magnetic fields are interlinked within the coil 8.

Figure 3:
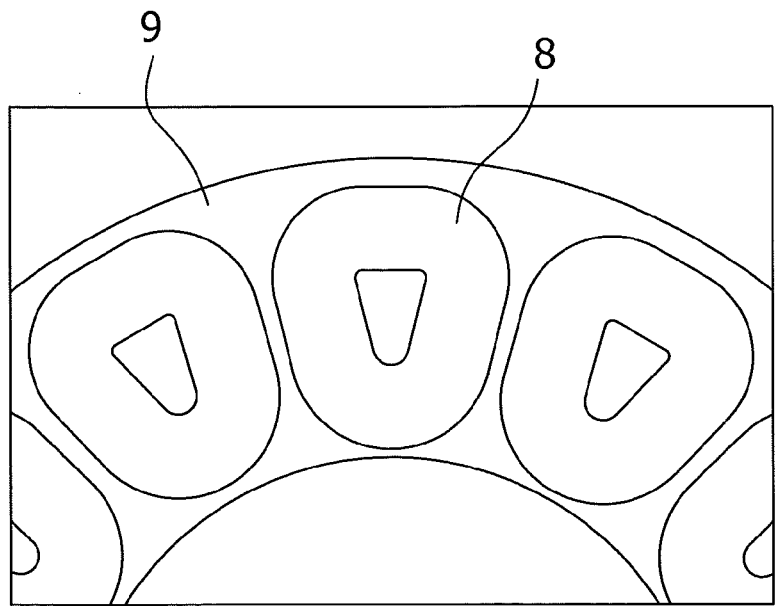
FIG. 3 is a plan view partly enlarging the stator in FIG. 2.
Figure 8:
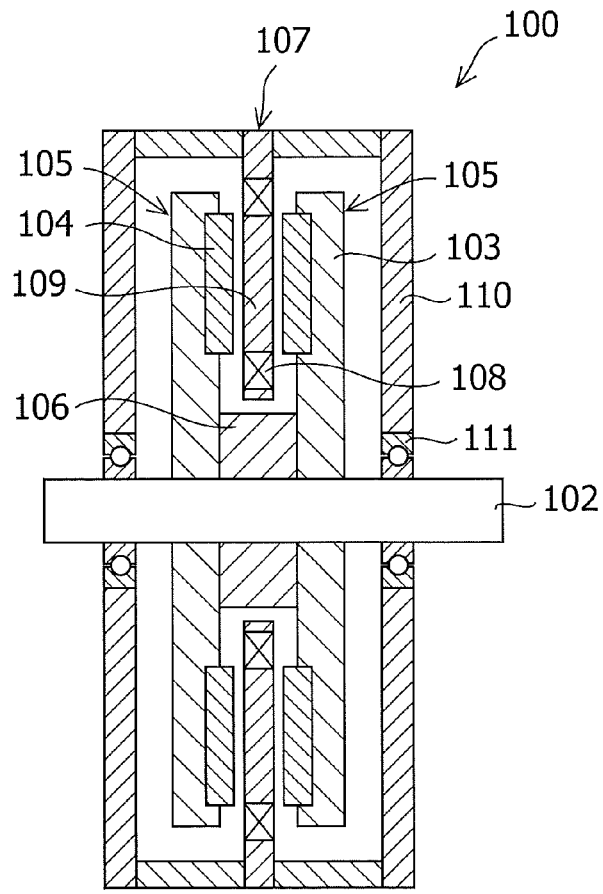
FIG. 8 is a sectional view of one embodiment of a conventional axial gap type rotating machine.

The embodiment of the invention shown in FIG. 1 is different from the conventional example shown in FIG. 8 in that a material having physical properties represented by a thermal conductivity of not less than 5 W/mK and an electrical conductivity of not more than $1 \times 10^5$ S/m is used for the coil holding member 9 (see FIG. 3). The value of an electrical conductivity of not more than $1 \times 10^5$ S/m is about one hundredth that of iron.

The reason for setting a thermal conductivity to be high as mentioned above is to effectively dissipate the heat generated from coils. The reason the thermal conductivity is set to the range not less than 5 W/mK will be described later in Examples. Furthermore, the reason for setting an electrical conductivity to be low as mentioned above is that, for the axial gap type of the invention, since the alternating magnetic field through the coil holding member 9 frequently changes its magnetic state, a higher electrical conductivity tends to induce flow of an eddy current, which increases a loss in a generator. To avoid such a situation, it is desirable to form the coil holding member 9 from a material having a low electrical conductivity through which an eddy current is difficult to flow.

Materials having a high thermal conductivity and a low electrical conductivity may be, but are not limited to, thermoplastic resins containing inorganic mineral particles. Specifically, the thermoplastic resins may include: liquid crystal polymer, polyamide, polypropylene, polycarbonate, polybutylene terephthalate, polyethylene terephthalate, polyimide, polyphenylene sulfide, polyethylene, acrylic resin, etc. Furthermore, the inorganic mineral particles may be formed of aluminum oxide, magnesia, aluminum nitride, boron nitride, boron carbide, graphite, etc. An inorganic mineral particle content may be controlled so that a desired thermal conductivity is achieved, but the amount of the inorganic mineral particles is preferably from 5 to 500 mass parts per 100 mass parts of the thermoplastic resin. The thermoplastic resin may comprise conventional additives such as a solvent and a plasticizer.

The coil holding member 9 is formed, for example, by molding and curing thermoplastic resin into a desired shape, with the coils being placed in a die.

Figure 2:
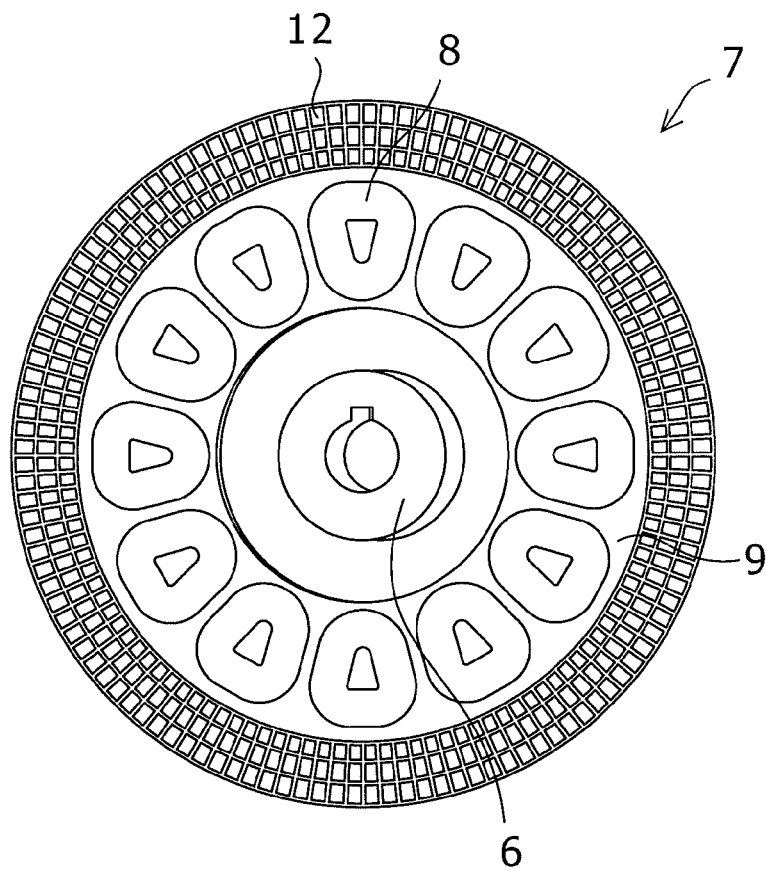
FIG. 2 is a perspective view of one embodiment of a stator according to the invention.

In addition, as shown in FIG. 2, a stator of the invention preferably comprises a radiation fin 12 that is disposed at an outer periphery of the coil holding member 9. The radiation fin 12 preferably has a thermal conductivity of not less than 150 W/mK, and more preferably has a thermal conductivity of not less than 200 W/mK. Furthermore, the radiation fin 12 has a concave-convex surface thereon, so that the surface area of the radiation fin 12 is preferably more than three times as large as the surface area of the main surface of the coil holding member, and more preferably three to eight times as large as the surface area thereof. Materials having a good thermal conductivity may be aluminum, gold, silver, copper, alloys thereof, etc. The topographically structured features on the surface of the radiation fin 12 may be formed, for example, by sputtering, blasting, or other treatment.

The aforementioned radiation fin 12 and the coil holding member 9 may be joined by bonding, screwing, etc.

Figure 4:
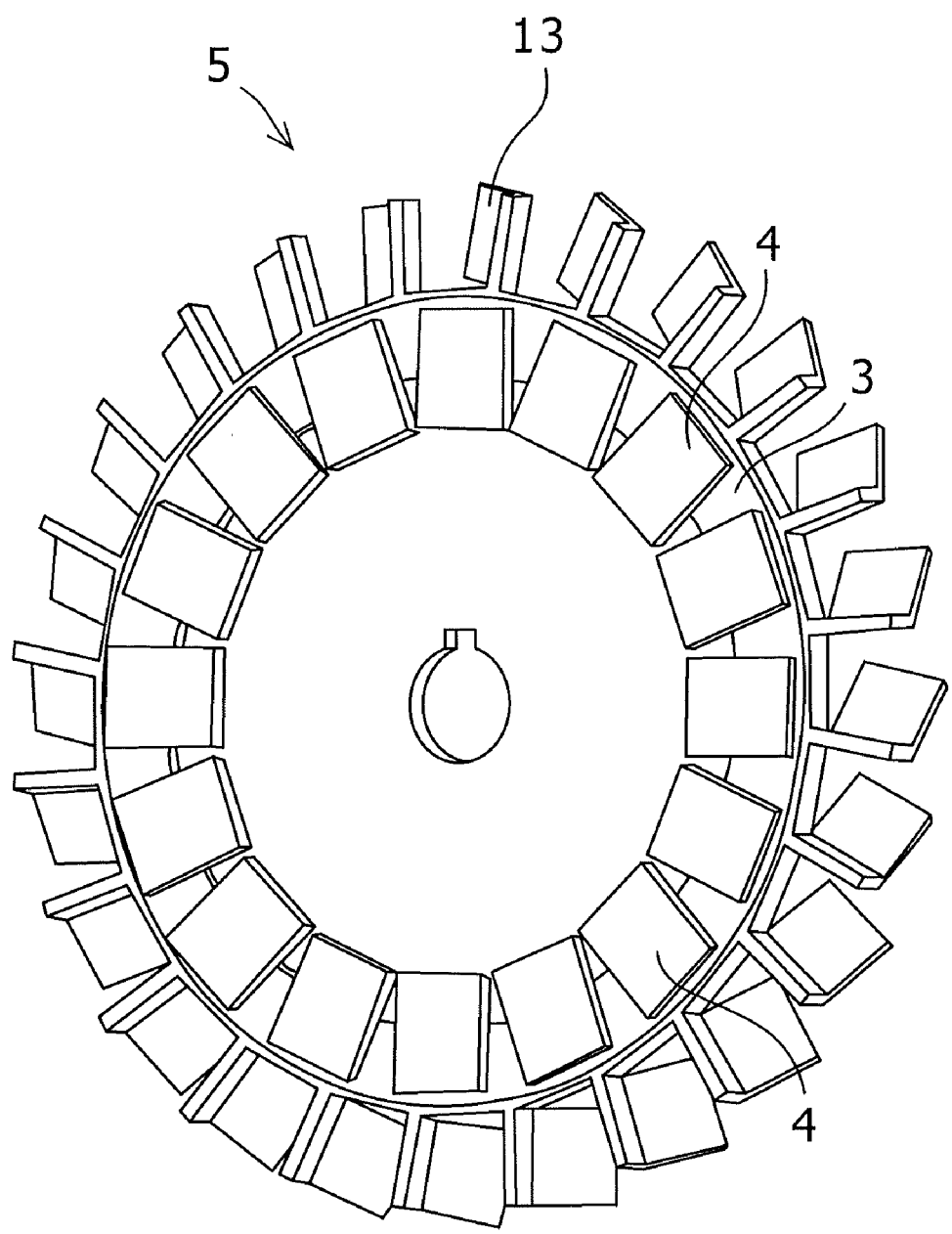
FIG. 4 is a perspective view of a rotor that is suitable for use in combination with a stator of the invention.

On the other hand, the rotor 5 preferably comprises a cooling fan 13 for cooling the radiation fin at the outer periphery of the rotor yoke 3 as shown in FIG. 4. Materials of the cooling fan 13 may be those produced by machining low carbon steel such as S15C, S45C, etc., or may be those produced by blanking a plate such as of SPCC and then bending or connecting by welding. The rotor yoke 3 and the cooling fan 13 may be joined by bonding, screwing, etc.

Figure 5:
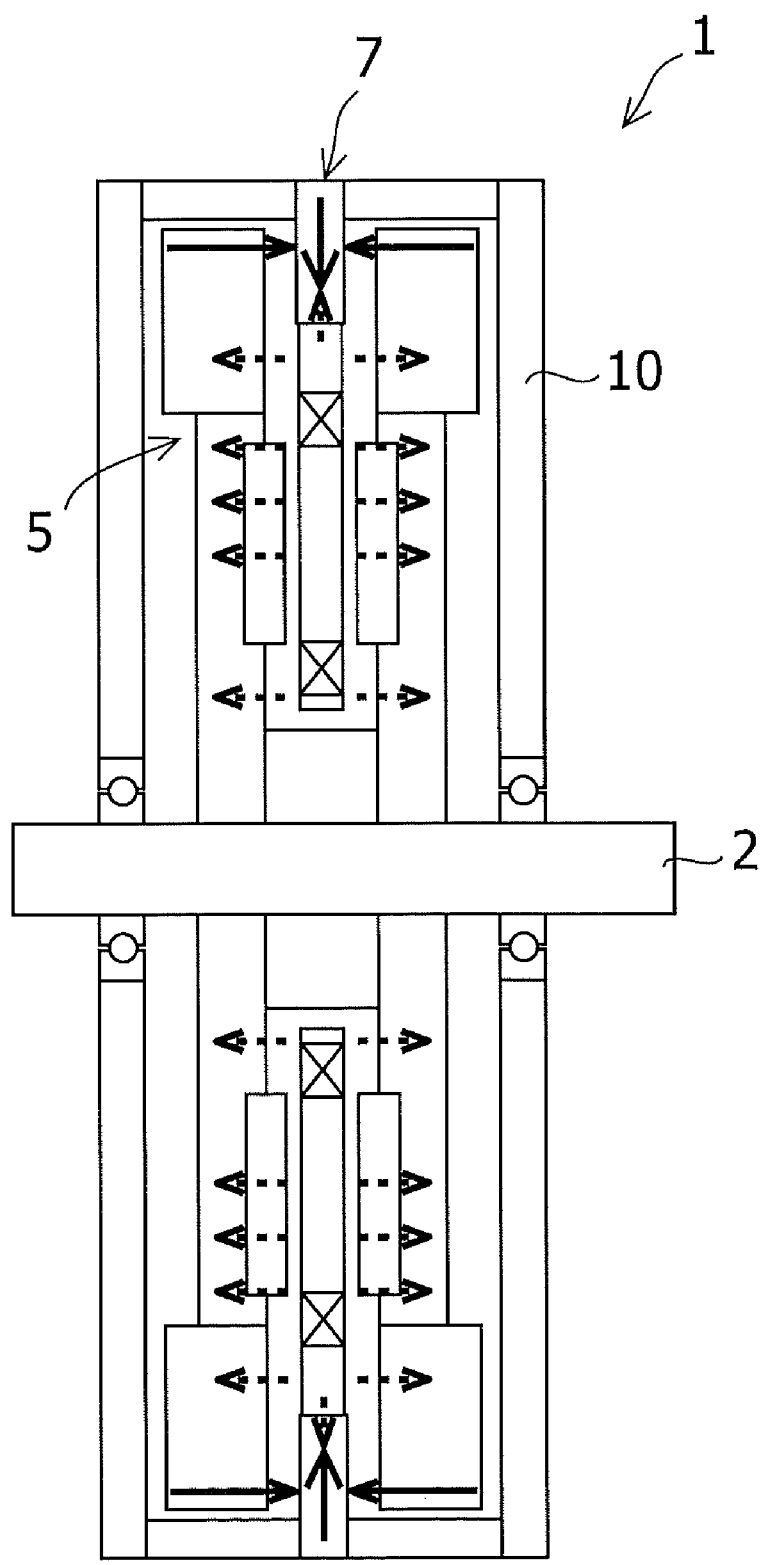
FIG. 5 conceptually shows the directions in which the cooling effect is exerted schematically indicated by arrows.

FIG. 5 shows the directions in which the cooling effect is exerted. A dashed line arrow represents a heat radiation direction, and a solid line arrow represents a cooling direction. Since a conventional coil holding member 9 is poor in thermal conductivity, it cannot effectively dissipate the heat generated from a copper wire, so that the temperature rises to such a degree that a coil 8 may be ruptured. In contrast, the coil holding member 9 of the invention has good thermal conductivity since it has a thermal conduction mechanism mediated by inorganic mineral particles contained therein. Accordingly, the heat generated by the coil 8 can be dissipated by in a direction toward the gap via the coil holding member 9 as shown by the dashed line arrow. Furthermore, rotation of the rotors causes the cooling fan to blow air in the directions shown by the solid line arrows, so that the radiation fin of the stator is cooled. The cooling effect thereof is applied to a copper wire via the cold holding member having a good thermal conductivity, so that the effect of cooling can be enhanced.

Figure 6:
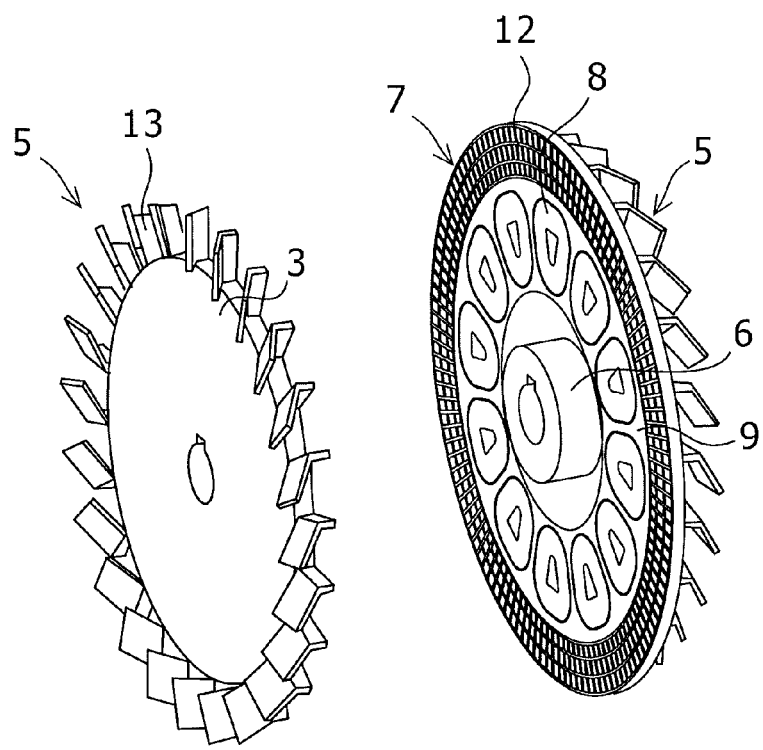
FIG. 6 is a schematic view showing a manner of combination of a stator and rotors of the invention.

FIG. 6 shows a perspective view showing a combination of the aforementioned rotors 5 and the aforementioned stator 7. The stator 7 is disposed in a gap which is formed by the spacer 6 between the rotors 5. Each rotor 5 has the cooling fans 13 which are arranged to have a predetermined inclination with respect to the face of the rotor yoke 3 so that air is blown to the radiation fin 12 from the side of the rotor 5 not facing the stator 7.

The axial gap type rotating machine of the invention is not limited to a structure comprising two rotors and one stator, but may be a rotating machine having a multi-stage structure comprising n+1 rotors and n stators.

The present invention will be described based on examples and comparative examples, but it should not be construed that the present invention is limited to the examples. Although the description is made of an Nd—Fe—B system permanent magnet, the present invention is not limited thereto.

EXAMPLES

First, a permanent magnet was produced as follows. An $Nd_2Fe_{14}B$ system alloy ingot was formed in a vacuum melting furnace by melting and casting Nd, Fe, Co, and M (M is Al, Si, Cu) each having the degree of purity of 99.7% by weight and B (Boron) having the degree of purity of 99.5% by weight. The obtained ingot was coarsely crushed by a jaw crusher, and was further subjected to jet mill crushing in a nitrogen gas stream, whereby fine powder having an average particle diameter of 3.5 μm was obtained. The obtained fine powder was filled in a die and molded under a molding pressure of 1.0 t/cm² in a magnetic field of 12 kG by a perpendicular magnetic field press. The resultant green body was subjected to sintering for an hour at 1090° C. in Ar gas, and was subsequently subjected to heat treatment for an hour at 580° C. The sintered body after being subjected to the heat treatment was in a shape like a rectangular parallelepiped block. This block was subjected to grinding by a grindstone to obtain a D-shaped permanent magnet. This resultant permanent magnet was characterized by Br: 13.0 kG, iHc: 22 kOe, $(BH)_{max}$: 40 MGOe.

Comparative Example

Figure 9:
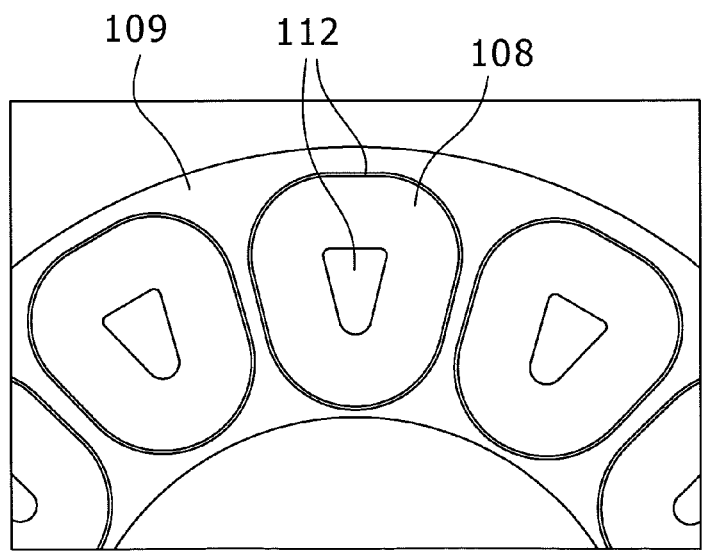
FIG. 9 is a plan view partly enlarging one embodiment of a conventional stator holding member.

As a comparative example, a conventional one is shown in FIG. 8. A motor 100 is constructed to have 16 poles and 12 coils. A rotor yoke 103 is a disk made of S15C having an outer diameter of 200 mm and a thickness of 5 mm. A permanent magnet was made of the aforementioned Nd—Fe—B system magnet, and had a width of 20 mm, a length of 36 mm, and a thickness in the magnetization direction of 4 mm. Sixteen magnets 104 were disposed on the surface of the rotor yoke 103 with the pole surfaces being alternately an N pole and an S pole, and bonded by epoxy-based adhesive. The magnets were opposed to magnets of reverse poles across a gap. A width of the gap was 8 mm, and a stator 107 was disposed in the gap. The coils 108 of the stator 107 were 12 coils, each of which was wound 30 turns. As shown in FIG. 9, these coils 108 were placed in a coil holding member 109 (having a thermal conductivity of 0.38 W/mK and an electrical conductivity of $0.25 \times 10^{-6}$ S/m) made of Bakelite, and were impregnated with epoxy resin 112. The coils were three-phase connected, in which four coils were connected in series for each phase, and they were connected by Y-connection. The rotors of this axial gap type rotating machine were rotated at 3600 rpm and used as an electric generator. When operated with a load under passage of a 30A current, the coil had a temperature of 150° C. As the rotating machine was continuously operated, the temperature of the coil reached a temperature (155° C.) at which the enamel coating of the copper wire ruptured and the coil was broken.

Example 1

The axial gap type rotating machine used in Example 1 is shown in FIG. 1. The materials and the dimensions were the same as the Comparative Example, except that the material of the coil holding member 9 was changed, the radiation fin 12 and the cooling fan 13 were added, and the housing 10 was extended in the radial direction.

The coil holding member 9 (having a thermal conductivity of 18 W/mK and a electrical conductivity of $0.12 \times 10^{-13}$ S/m) was made of thermoplastic resin (liquid crystal polymer) containing inorganic mineral particles made of aluminum oxide. The coils 8 were impregnated and formed as shown in FIG. 2. The radiation fin 12 was made of aluminum (having a heat conductivity of 236 W/mK) and topographically structured features were made on the surface thereof to increase the surface area thereof threefold, so that the cooling effect from the cooling fan 13 was effectively applied to the coil holding member 9. The cooling fans 13 were those produced by blanking and then bending or connecting by welding. Similar to the Comparative Example, the rotor were rotated at 3600 rpm and used as an electric generator. When operated with a load under passage of a 30A current, the temperature of the coil was suppressed so as not to increase beyond 80° C. The coils were not broken during further continuous operation.

Example 2

Figure 7:
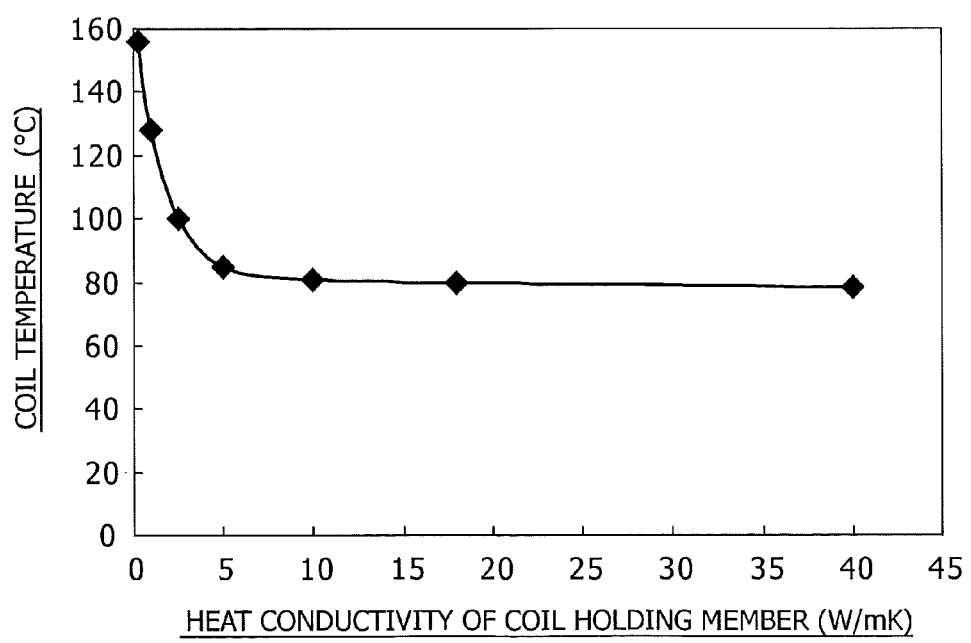
FIG. 7 is a graph showing a correlation between a thermal conductivity of a coil holding member and a coil temperature.

The material of the coil holding member 9 in FIG. 2 was changed, and the same test as conducted on Example 1 above was carried out. The conditions of the test were the same as those when testing Example 1, except that the material of the coil holding member 9 was changed. Through this test, the relationship between the thermal conductivity of the coil holding member 9 and the coil temperature was found. The test results were shown in FIG. 7 and Table 1. Note that since there was no appropriate material having a thermal conductivity of 40 W/mK (electrical conductivity: $1\times10^5$ S/m), the test result value thereof was not an observation result. The value that was obtained by heat transfer analysis using a finite-element method was used and complemented.

TABLE 1

| | Thermal Conductivity of Coil Holding Member (W/mK) | | | | | | |
|---|---|---|---|---|---|---|---|
| | 0.1 | 1 | 2.5 | 5 | 10 | 18 | 40 |
| Coil Temperature (° C.) | 158 | 128 | 100 | 85 | 81 | 80 | 78 |

These results showed that the coil temperature increase was small when the thermal conductivity was not less that 5 W/mK, i.e., good heat dissipation was ensured insofar as the thermal conductivity was not less than 5 W/mK.

Example 3

The same test as conducted on Example 1 above was carried out on Example 3 except that the material of the radiation fin was changed to iron, and the radiation fin was formed to have a surface area that was four times as large as that of the face of the coil holding member. Note that since there was no appropriate material having a thermal conductivity of 20, 180, and 400 W/mK (electrical conductivity: $1\times10^5$ S/m), the test result values thereof were not observation results. The values that were obtained by heat transfer analysis using a finite-element method were used.

The conditions of the test were the same as those when testing Example 1, except that the material of the radiation fin 12 was changed. Through this test, the relationship between the thermal conductivity of the radiation fin and the coil temperature was found. The test results were shown in Table 2.

TABLE 2

| | Thermal Conductivity of Radiation Fin (W/mK) | | | | |
|---|---|---|---|---|---|
| | 20 | 80 (iron) | 180 | 236 | 400 |
| Coil Temperature (° C.) | 107 | 88 | 81 | 80 | 78 |

These results showed that the coil temperature increase was small when the thermal conductivity was not less that 150 W/mK, i.e., good heat dissipation was ensured insofar as the thermal conductivity was not less than 150 W/mK.

Example 4

A material of the coil holding member shown in FIG. 2 was changed to aluminum (having an electrical conductivity of $3.69\times10^7$ S/m) and the same test as conducted in Example 1 above was carried out. The conditions of the test were the same as in Example 1 except that the material of the coil holding member was changed. As the test results, under the effect of the eddy current passing through aluminum, the generating efficiency of 81% that was obtained in Example 1 decreased to 70% in Example 3. According to the calculation using the magnetic field analysis by an integration element method, the loss by eddy current in Example 1 was about 0 W, whereas that of Example 4 was 800 W or more. When calculation was performed by analysis using an electrical conductivity value $1\times10^5$ S/m, the calculated loss was as small as approximately several watts. This calculation results showed that the generating efficiency was not adversely affected insofar as the electrical conductivity of the coil holding member was not more than $1\times10^5$ S/m.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. An axial gap type rotating machine comprising:
a rotating shaft;
a rotor that is arranged along the axial direction of the rotating shaft and is rotatable integrally with the rotating shaft, said rotor comprising a rotary table and permanent magnets disposed on at least one surface of the rotary table;
a stator comprising: a coil holding member; coils secured to the coil holding member; a radiation fin at a circumference of the coil holding member, the coil holding member comprising a material having a thermal conductivity of not less than 5 W/mK that is measured compliant with the ASTM E1530 and having an electrical conductivity of not more than $1\times10^5$ S/m that is measured compliant with the ASTM E345, said radiation fin having a thermal conductivity of not less than 150 W/mK, and having a concave-convex surface so that the surface area of the radiation fin is more than three times as large as an area of the main surface of the coil holding member, the stator being disposed to be separated from the rotating shaft and to be spaced apart from the rotor so that a main surface of the stator is opposed to a main surface of the rotor on which the magnets are placed; and
a cooling fan that is disposed at a circumference of said rotor for blowing air to the concave-convex surface of the radiation fin,
wherein the coils are secured to a housing of the axial gap type rotating machine via said radiation fin, and wherein the concave-convex surface of said radiation fin is in spaced apart face-to-face relationship with the cooling fan.

* * * * *